US007954061B2

(12) United States Patent  
McInerney

(10) Patent No.: US 7,954,061 B2
(45) Date of Patent: May 31, 2011

(54) CREATION AND MANIPULATION OF INTERNET LOCATION OBJECTS IN A GRAPHICAL USER INTERFACE ENVIRONMENT

(75) Inventor: Peter Joseph McInerney, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 839 days.

(21) Appl. No.: 10/832,769

(22) Filed: Apr. 26, 2004

(65) Prior Publication Data

US 2004/0201630 A1    Oct. 14, 2004

Related U.S. Application Data

(63) Continuation of application No. 09/074,994, filed on May 8, 1998, now Pat. No. 6,727,923.

(51) Int. Cl.
*G06F 3/00* (2006.01)

(52) U.S. Cl. ........ 715/769; 715/847; 715/738; 715/804; 715/855

(58) Field of Classification Search .......... 715/738, 715/769, 804, 855, 847
See application file for complete search history.

(56) References Cited

U.S. PATENT DOCUMENTS

| | | | |
|---|---|---|---|
| 5,659,791 A * | 8/1997 | Nakajima et al. ............ 715/539 |
| 5,717,877 A | 2/1998 | Orton et al. |
| 5,724,595 A | 3/1998 | Gentner |
| 5,737,560 A | 4/1998 | Yohanan |
| 5,831,606 A * | 11/1998 | Nakajima et al. ............ 715/841 |
| 5,890,172 A | 3/1999 | Borman et al. |
| 5,896,533 A | 4/1999 | Ramos et al. |
| 5,914,714 A * | 6/1999 | Brown .......................... 715/866 |
| 5,958,008 A | 9/1999 | Pogrebisky et al. |
| 5,974,455 A | 10/1999 | Monier |
| 5,987,510 A | 11/1999 | Imai et al. |
| 6,032,196 A | 2/2000 | Monier |
| 6,035,330 A | 3/2000 | Astiz et al. |
| 6,041,324 A | 3/2000 | Earl et al. |
| 6,091,409 A | 7/2000 | Dickman et al. |
| 6,133,912 A * | 10/2000 | Montero ....................... 715/716 |
| 6,138,150 A | 10/2000 | Nichols et al. |
| 6,148,334 A | 11/2000 | Imai et al. |
| 6,212,577 B1 | 4/2001 | Stern et al. |
| 6,266,684 B1 | 7/2001 | Kraus et al. |
| 6,278,448 B1 * | 8/2001 | Brown et al. ................. 715/866 |
| 6,460,058 B2 | 10/2002 | Koppolu et al. |
| 6,470,383 B1 | 10/2002 | Leshem et al. |
| 6,572,660 B1 * | 6/2003 | Okamoto .................... 715/500.1 |
| 6,654,786 B1 * | 11/2003 | Fox et al. ..................... 709/203 |
| 2002/0107946 A1 * | 8/2002 | Albers ......................... 709/223 |

* cited by examiner

*Primary Examiner* — Dennis Bonshock
(74) *Attorney, Agent, or Firm* — Buchanan Ingersoll & Rooney PC

(57) ABSTRACT

Internet location objects are created and displayed as icons in a graphical user interface environment. When an object is dragged from within an application into a system window, a drag object describing what is being dragged is passed from the application to the operating system. Depending on the drag object, the file manager either causes an Internet location object to be created directly or intelligently parses a text string that has been dragged and dropped onto the user desktop to determine whether the text string is likely a URL. If a text string is found to likely be a URL, then an Internet location object is created to contain a URL by transforming the text string into the URL. When the user "opens" an Internet location object, a browser or other program is launched and retrieves the resource identified by the URL stored as part of the Internet location object.

39 Claims, 4 Drawing Sheets

CREATION AND MANIPULATION OF INTERNET LOCATION OBJECTS IN A GRAPHICAL USER INTERFACE ENVIRONMENT

RELATED APPLICATIONS

This application is a continuation of U.S. application Ser. No. 09/074,994, filed May 8, 1998, now U.S. Pat. No. 6,727,923, the contents of which are incorporated by reference herein.

BACKGROUND OF THE INVENTION

1. Field of the Invention

The present invention relates to the retrieval of computer resources.

2. State of the Art

In the space of just a few years, the Internet has gone from being a buzzword to being an indispensable part of the way people work. Information is located on the Internet using Uniform Resource Locators, or URLs. The most familiar type of URL is the Web page address, e.g., www.company.com. Many other types of URLs may also be used, for example, network locations, FTP locations, news locations, e-mail addresses, file locations, network zones, etc. As the Internet has progressed from being a curiosity to being a heavily-used tool, a need has arisen for organizing URLs in such a way as to facilitate repeated access of an Internet resource. The most familiar way of organizing URLs is to simply add URLs to a "favorites list," organized alphabetically. When an Internet resource is accessed and displayed under control of a Web browser, the user may select a command to add the URL of the resource to a menu-style favorites list. The URL itself may be displayed within the list, or a natural-language description of the resource may be displayed. To access the same resource again at a later time, the user may simply select the appropriate entry within the list.

Although a favorites list is very useful, it is a simple, fixed organizational scheme that can only become increasingly cumbersome with increased use. An alternative approach to organizing URLs is described in U.S. Pat. No. 5,737,560, incorporated herein by reference. This patent describes a "Web Jumper" software tool that may be used to create "jumpsites." A jumpsite is an iconographic representation of a URL. Doubling clicking on a jumpsite causes a Web browser to be activated to retrieve the resource specified by the URL. An options button allows a user to set a default Web browser and a default directory in which a jumpsite is stored. This solution, while providing a great improvement over conventional favorites lists, leaves considerable room for improvement. In particular, because URLs are machine-intelligible but not necessarily machine intelligible, user interaction with URLs should not only avoid typing of URLs but should also be "forgiving" when a URL is incompletely specified. Furthermore, because the Internet is still rapidly evolving, flexibility should be preserved to use URLs in many different ways with potentially many different programs. What is needed, then, is a flexible user-driven method of creating and organizing URLs on a user machine.

SUMMARY OF THE INVENTION

The present invention, generally speaking, provides a flexible, user-driven method of creating and organizing URLs on a user machine. In one embodiment of the invention, Internet location objects are created and displayed as icons in a graphical user interface (GUI) environment. Internet location objects may be manipulated by the user in similar fashion as other GUI objects, e.g., files, folders, aliases, etc. The full organizational power of a hierarchical GUI file system is therefore brought to bear on the problem of organizing URLs. Internet location objects may be created through "drag-and-drop" manipulation of text. When an object is dragged from within an application into a system window, a drag object describing what is being dragged is passed from the application to the operating system. An application may be aware of Internet location objects and, when an object is dragged from within the application into the system window, may specify that the object being dragged is a URL. Alternatively, the application may be unaware of or not support Internet locations but support generic text drag-and-drop, in which case the application, instead of specifying a "URL drag flavor," specifies a "text drag flavor" as part of the drag object. Depending on the drag flavor, the file manager either causes an Internet location object (URL drag flavor) to be created directly or intelligently parses a text string that has been dragged and dropped onto the user desktop to determine whether the text string is likely a URL (text drag flavor). If a text string specified as part of a text flavor drag object is found to likely be a URL, then an Internet location object is created. Otherwise, a different behavior is followed, e.g., a "clipping" object or other object may be created. Preferably, an icon used to represent an Internet location object is suggestive of the function of the Internet location object and is distinctively different from an icon used to represent a clipping object. When the user "opens" an Internet location object, a browser or other assigned program is launched and retrieves the resource identified by the URL stored as part of the Internet location object. The resource may be located remotely or may be located on the local user machine. In particular, a URL can refer to resources that are not "on the net" (and which do not represent cached net resources). For example, URLs can be used to refer to files or directories on hard drives attached to a user machine independently of whether the machine is or has ever been attached to a network. URLs can thus serve a function very similar to aliases.

BRIEF DESCRIPTION OF THE DRAWINGS

The present invention may be further understood from the following description in conjunction with the appended drawings. In the drawings.

DETAILED DESCRIPTION OF THE PREFERRED EMBODIMENTS

Figure 1:
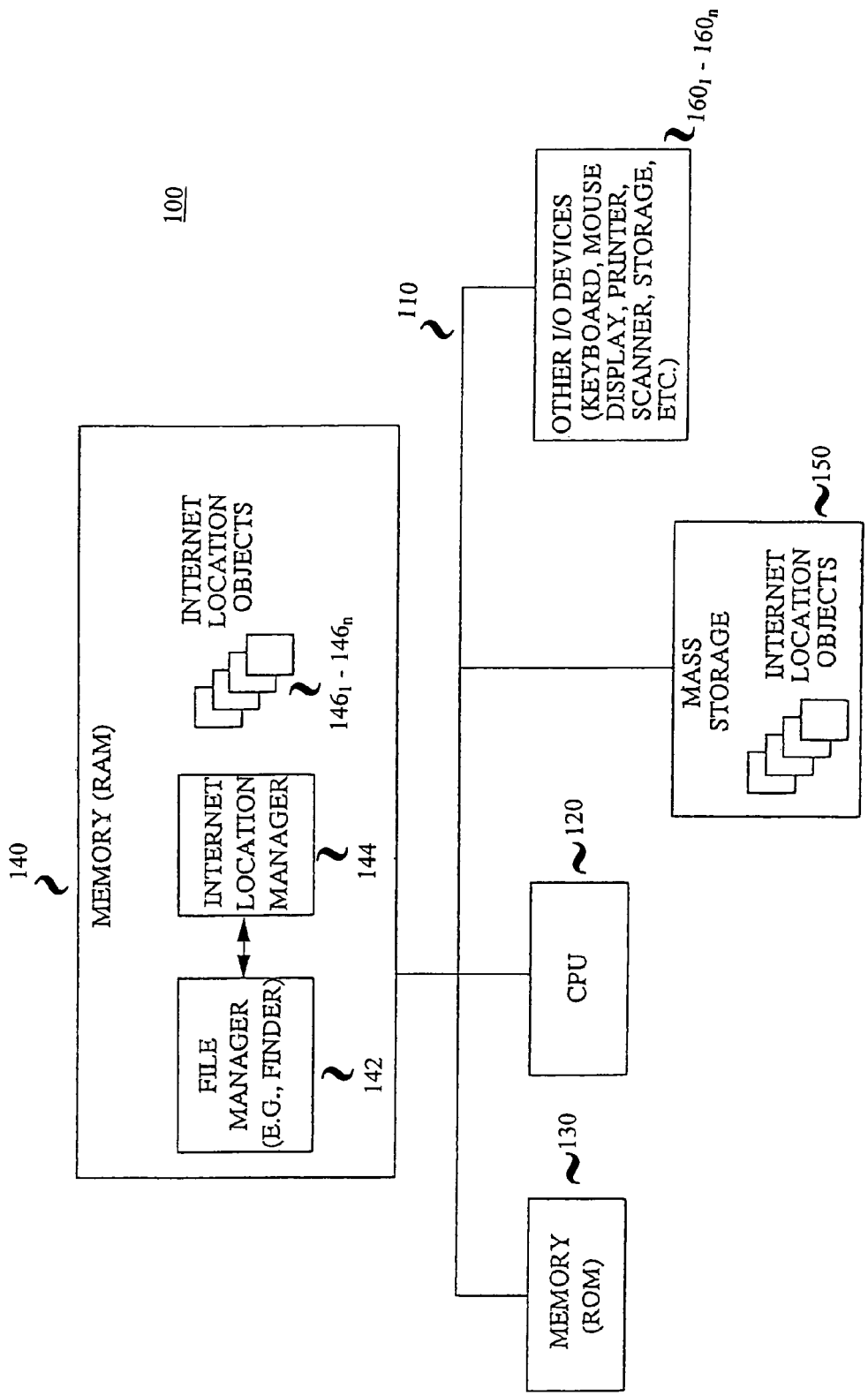
FIG. 1 is a block diagram showing a computer system within which the present invention may be used.

Referring now to FIG. 1, a block diagram is shown of a computer system 100 within which the present invention may be used. Attached to a system bus 110 are a CPU 120, read-only memory (ROM) 130, read/write memory (RAM) 140, mass storage 150, and other I/O devices $160_1$-$160_n$ (n>1; hereinafter collectively identified by reference numeral 160, unless otherwise noted). The other I/O devices 160 typically include a keyboard, a pointing device and a display, and may further include any of a wide variety of commercially available I/O devices including, for example, magnetic storage devices (e.g., floppy disk drive), optical storage devices (CD, VCD, DVD, MO, etc.), other storage devices (e.g., card readers or read/write devices), printers, scanners, cameras, speakers, etc.

Read/write memory 140 includes a system portion and a user portion. The system portion is used by the computer operating system and includes various operating system components of which only two are illustrated as being of particular interest for purposes of the present invention, namely a file manager 142 and an Internet location manager 144. The term "file manager" is used generically to refer to a GUI component that allows for the creation of data objects, typically represented by icons, and for user manipulation of those icons. One example of such a file manager 142 is the "Finder" component of the Macintosh® operating system sold by Apple Computer®. In an exemplary embodiment of the present invention, a new operating system component—an Internet location manager 144—is added, and the file manager 142 is modified to support the desired behaviors of the Internet location manager 144. Preferably, the file manager 142 and the Internet location manager 144 communicate in a bidirectional fashion.

The function of the Internet location manager 144 is to create Internet location objects $146_1$-$146_n$ (hereinafter collectively identified by reference numeral 146, unless otherwise noted), allow the desired behavior of the Internet location objects 146 to be specified, and to help effectuate a desired behavior when an Internet location object 146 is activated.

In an alternative embodiment, the functionality of creating and using Internet location objects 146 may be divided between the Finder (file manager 142) and an existing Internet control panel. In this embodiment, the Finder is solely responsible for creating Internet location objects 146. The Finder recognizes that a URL has been double clicked on and requests the Internet control panel to launch the correct application. The Internet control panel (or "Internet config") actually launches different applications depending on the type of URL.

In an exemplary embodiment, Internet location objects 146 are files containing two resources, a "TEXT" resource and a "URL" resource. The "URL" resource always contains the URL as it will be presented to a browser or other program. The "TEXT" resource contains the original text used to create the Internet location object 146, and may be incomplete. For example, the "TEXT" resource might contain "apple.com" and the corresponding "URL" resource might contain "http://apple.com." The text resource may also contain a more human readable form of the URL. For example, the "TEXT" resource might contain "http://Some organization.org" while the "URL" contains "http://Some%20organization.com."

Figure 2:
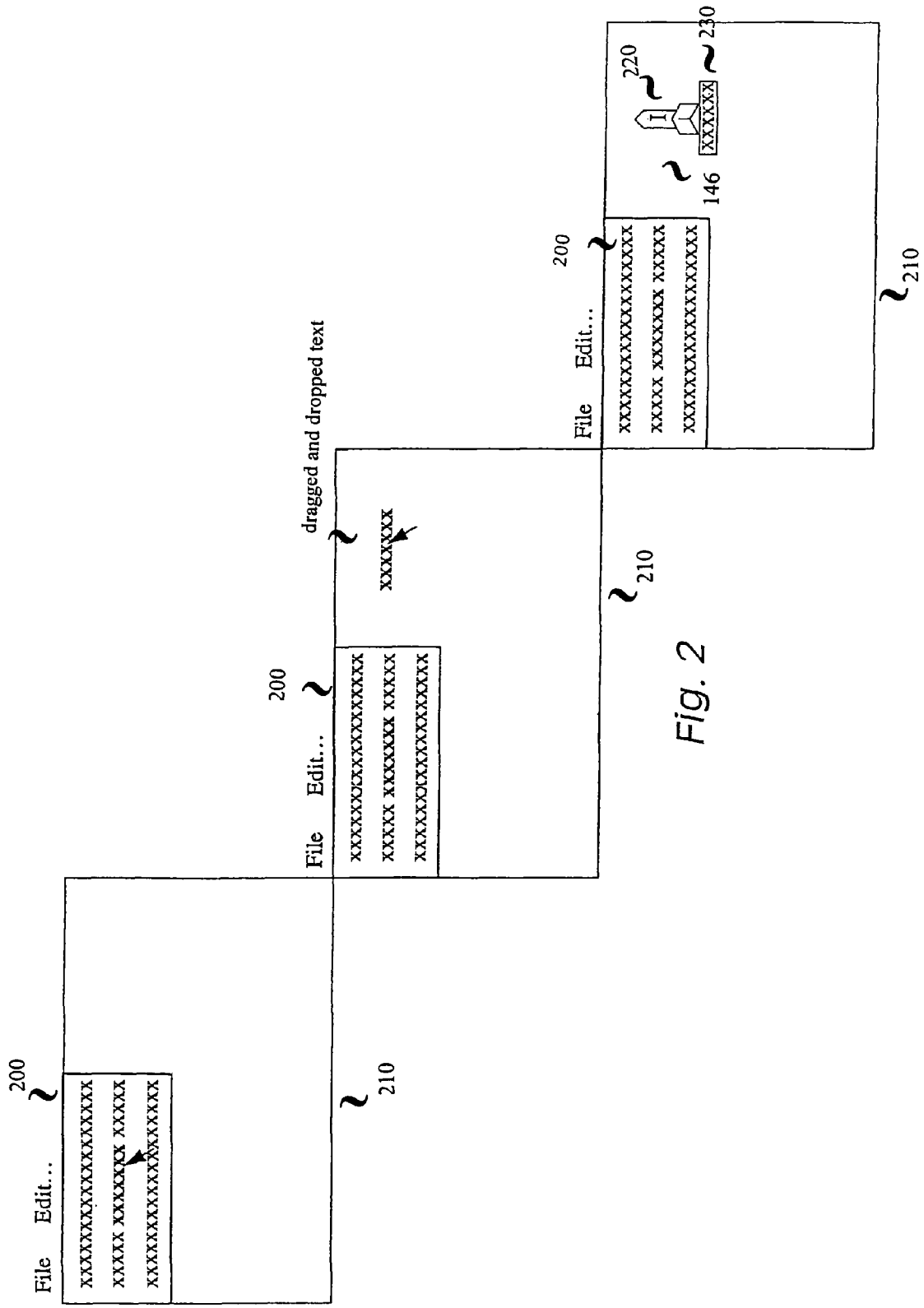
FIG. 2 is a sequence of simplified screen displays illustrating drag-and-drop creation of an Internet location object.

A preferred method of creating Internet location objects 146 is provided that may be used regardless of program version. Referring to FIG. 2, text 200 is selected by the user and is then "dragged and dropped" within the base window 210 (i.e., onto the "desktop") of the GUI-based system. Such a drag-and-drop metaphor is commonly used to create "clippings," i.e., text selections that can be pasted into a document, e.g., using the same drag-and-drop action. Depending on the drag flavor, the file manager 142 either causes an Internet location object 146 (URL flavor) to be created directly or intelligently parses a text string that has been dragged and dropped onto the user desktop to determine whether the text string is likely a URL (text flavor). Parsing intelligence is incorporated into the Internet location manager 144 in order to distinguish likely Internet locations from ordinary clippings, as described more fully hereinafter. Assuming that the text is determined to be an Internet location, an Internet location object 146 is created and represented by a distinctive icon 220 placed on the desktop, for example. Associated with the icon is a default name 230, for example the text string itself or a portion thereof. The user may rename the Internet location object 146 if desired, e.g., by doubling clicking on the name 230 (not the icon 220). Once an icon 220 has been created, it can be manipulated like any other icon—moved, copied, renamed, stored in a folder, removed, etc.

Alternatively, when the text is determined to be an Internet location, a dialog may be displayed, allowing the user to specify a name, location and program in a manner similar to that described in the aforementioned patent.

Figure 3:
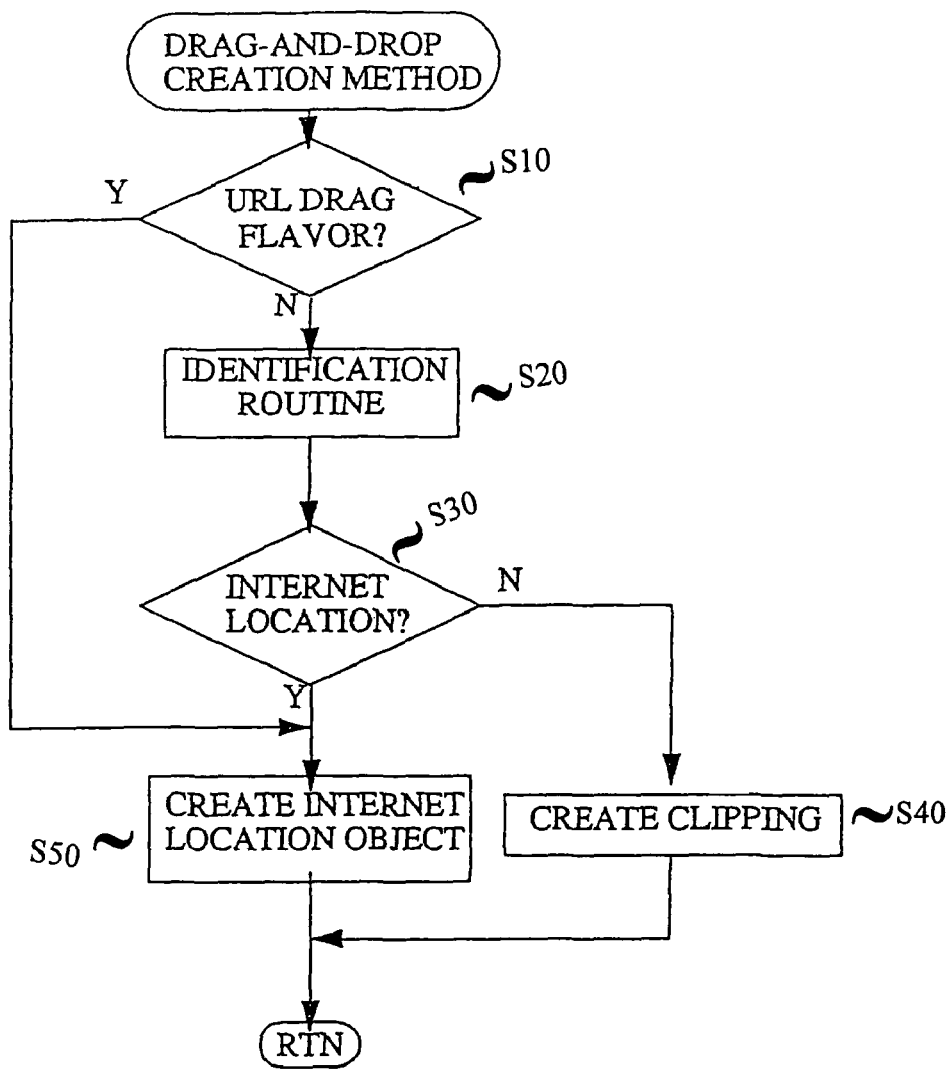
FIG. 3 is a flowchart of program steps performed in creating an Internet location object by the drag-and-drop method.
Figure 4:
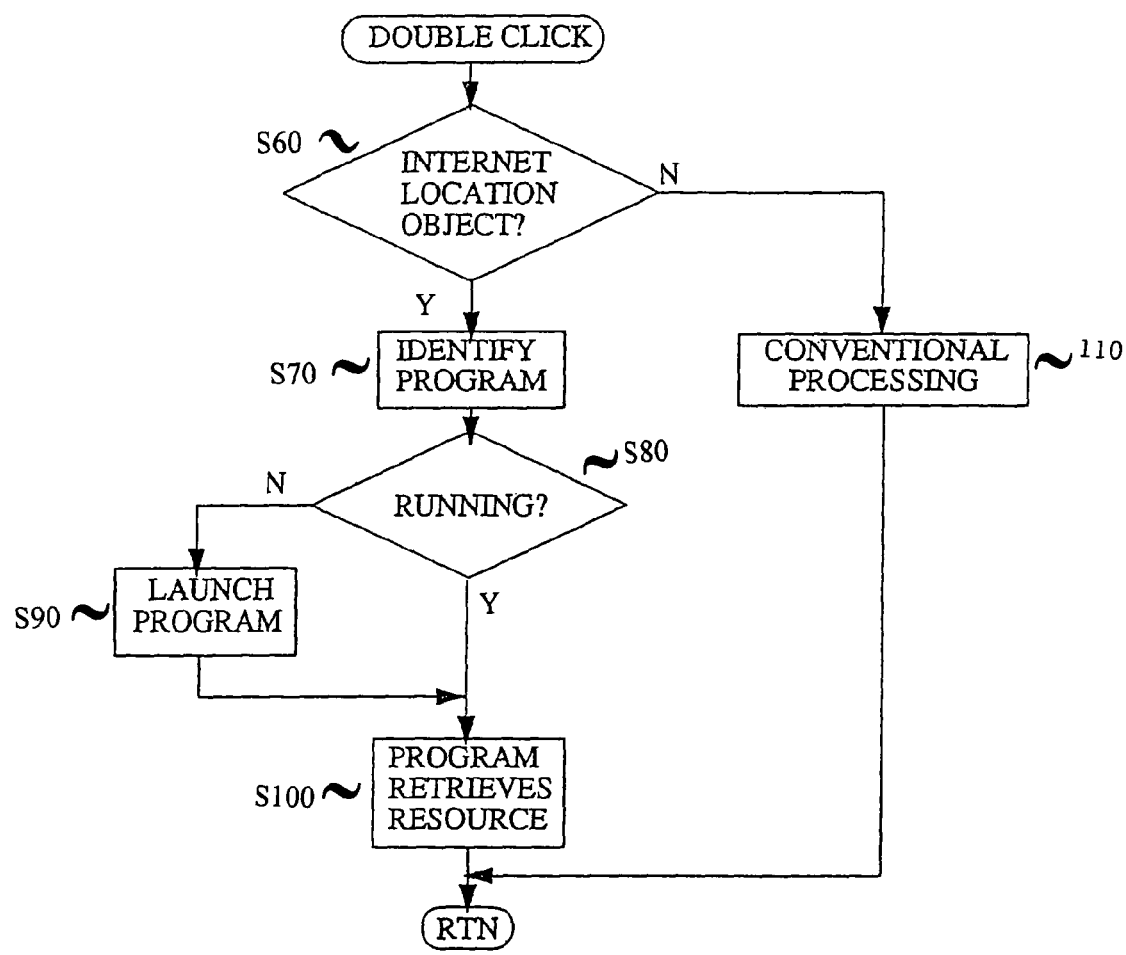
FIG. 4 is a flowchart of program steps performed in "opening" an Internet location object.

Flowcharts of program steps performed in creating an Internet location object 146 by the drag-and-drop method and "opening" an Internet location object are shown in FIG. 3 and FIG. 4, respectively. Referring first to FIG. 3, in accordance with the drag-and-drop method of Internet location object creation, the file manager 142 checks the drag flavor specified in the drag object received from an application. If the drag flavor is "URL" (Y in step S10), the file manager 142 causes an Internet location object 146 to be created directly (step S50). If the drag flavor is text (N in step S10), the file manager 142 performs an identification routine (step S20). During the identification routine, the dropped text string is parsed, looking for certain "header" substrings (e.g, http://, ftp://, afp://, file://, mailto://, news:, at://, etc.), certain "subheader" strings (e.g, www., web., net., etc.), and certain "tail" substrings (e.g., .com, .org, .edu, .mil, etc.). The headers afp:// and at:// are used in an Apple® network browser to specify locations on a local area network (LAN).

The identification routine of step S20_first looks for a header. If no header is found, then the identification routine looks for a suitable subheader, and if a subheader is found, looks for a tail. If a tail is found, then the text string is identified as a Web location, and the string is completed with the header "http://." If no header is found and no subheader is found, then the identification routine looks for an e-mail address (e.g., foo@bar). If an email address is found, the string is completed with the "mailto:" header.

Although the foregoing heuristic has been found to give satisfactory results, the identification routine will result in some misidentifications. In other embodiments, the identification routine may be customizable by the user to add and remove substrings from the preceding categories and/or to specify a desired "confidence level" for creating an Internet location object 146. The addition of headers, subheaders and tails may be provided for through an explicit interface or may be accomplished using familiar resource editing tools such as Resedit®.

If desired, the same identification routine may be performed in a program whenever text is highlighted. If the text is identified as an Internet location, then an Internet location object may be immediately created using specified defaults or a dialog may be displayed, without requiring the user to drag the selected text to the desktop.

Referring again to FIG. 3, once the identification routine of step S20 has been completed, if the text string was identified as an Internet location (Y in step S30), then the file manager 142 calls the Internet location manager 144. If the text string was not identified as an Internet location (N in step S30), then a clipping may be created in the usual fashion (step S40), or some other behavior may occur.

Referring to FIG. 4, when an icon is double clicked, if it represents an Internet location object 146 (Y in step S60), then the program registered for that Internet location object 146 is identified (step S70). If the identified program is not yet running (N in step S80), the identified program is caused to run (i.e., be launched) (step S90). The launched program then "opens" the Internet location object 146 and retrieves the resource identified by it (step S100). If the program registered for the Internet location object 146 is determined to be already running (Y in step S80), then step S90 is bypassed. If the icon does not represent an Internet location object (N in step S60), then conventional processing ensues (step S110), depending on what the icon represents.

The association of programs to Internet location objects 146 is performed according to the type of Internet location. For example, through an interface to the Internet location manager 144, a user may specify that all Web locations (http://) open Microsoft Internet Explorer® when double clicked or that e-mail addresses (bob@foo.net) open the Eudora® mailer, or that network zones open a network browser.

It will be appreciated by those of ordinary skill in the art that the invention can be embodied in other specific forms without departing from the spirit or essential character thereof. The presently disclosed embodiments are therefore considered n all respects to be illustrative and not restrictive. The scope of the invention is indicated by the appended claims rather than the foregoing description, and all changes which come within the meaning and range of equivalents thereof are intended to be embraced therein.

What is claimed is:

1. A computer-implemented method, comprising:
   receiving, using one or more processing units, a dragged text selection;
   identifying, using the one or more processing units, whether the text selection represents a Uniform Resource Locator ("URL") resource or a text resource, wherein identifying includes:
      using the text selection to automatically generate an Internet location object when a URL resource is identified, the URL resource including an Internet location, and
      using the text selection to perform an identification routine when a text resource is identified, wherein the identification routine includes parsing intelligence for determining whether the text selection is incomplete, and wherein when the text selection is incomplete, an Internet location object is automatically generated by completing the text selection so that the completed text selection identifies an Internet location; and
   associating, using the one or more processing units, each Internet location object with one of a plurality of programs according to an Internet location type, wherein when an Internet location object is activated, the associated program is run, and the associated program retrieves the identified resource based upon the Internet location object.

2. The method of claim 1, wherein an Internet location manager generates Internet location objects, specifies corresponding Internet location object behavior, and effectuates the Internet location object behavior when the corresponding Internet location object is activated.

3. The method of claim 2, wherein the parsing intelligence is incorporated into the Internet location manager.

4. The method of claim 1, wherein the identification routine is customizable.

5. The method of claim 4, wherein customizing the identification routine includes adding or removing one or more header substrings.

6. The method of claim 4, wherein customizing the identification routine includes specifying a confidence level for automatically generating the Internet location object.

7. The method of claim 1, wherein a file manager performs the identification routine.

8. The method of claim 7, wherein the identification routine includes parsing the text selection for particular header substrings, particular sub-header substrings, and particular tail strings.

9. The method of claim 1, wherein a particular identification routine is performed whenever the text selection includes highlighted text.

10. The method of claim 1, wherein the Internet location object includes a text resource and a URL resource, wherein the URL resource includes the URL, and wherein the text resource includes the text used to generate the Internet resource object.

11. The method of claim 1, wherein the Internet location object is represented by an icon, wherein the icon is associated with a default name, and wherein double-clicking the icon activates the associated Internet location object.

12. The method of claim 1, wherein when the text selection includes an Internet location, a dialog is displayed.

13. The method of claim 1, wherein Internet location types include Web locations and e-mail addresses.

14. A system, comprising:
   one or more processors;
   a computer-readable storage medium containing instructions configured to cause the one or more processors to perform operations, including:
   receiving a dragged text selection;
   identifying whether the text selection represents a Uniform Resource Locator ("URL") resource or a text resource, wherein identifying includes:
      using the text selection to automatically generate an Internet location object when a URL resource is identified, the URL resource including an Internet location, and
      using the text selection to perform an identification routine when a text resource is identified, wherein the identification routine includes parsing intelligence for determining whether the text selection is incomplete, and wherein when the text selection is incomplete, an Internet location object is automatically generated by completing the text selection so that the completed text selection identifies an Internet location; and
   associating each Internet location object with one of a plurality of programs according to an Internet location type, wherein when an Internet location object is activated, the associated program is run, and the associated program retrieves the identified resource based upon the Internet location object.

15. The system of claim 14, wherein an Internet location manager generates Internet location objects, specifies corresponding Internet location object behavior, and effectuates the Internet location object behavior when the corresponding Internet location object is activated.

16. The system of claim 15, wherein the parsing intelligence is incorporated into the Internet location manager.

17. The system of claim 14, wherein the identification routine is customizable.

18. The system of claim 17, wherein customizing the identification routine includes adding or removing one or more header substrings.

19. The system of claim 17, wherein customizing the identification routine includes specifying a confidence level for automatically generating the Internet location object.

20. The system of claim 14, wherein a file manager performs the identification routine.

21. The system of claim 20, wherein the identification routine includes parsing the text selection for particular header substrings, particular sub-header substrings, and particular tail strings.

22. The system of claim 14, wherein a particular identification routine is performed whenever the text selection includes highlighted text.

23. The system of claim 14, wherein the Internet location object includes a text resource and a URL resource, wherein the URL resource includes the URL, and wherein the text resource includes the text used to generate the Internet resource object.

24. The system of claim 14, wherein the Internet location object is represented by an icon, wherein the icon is associated with a default name, and wherein double-clicking the icon activates the associated Internet location object.

25. The system of claim 14, wherein when the text selection includes an Internet location, a dialog is displayed.

26. The system of claim 14, wherein Internet location types include Web locations and e-mail addresses.

27. A computer-program product, tangibly embodied in a machine-readable storage medium, including instructions configured to cause a data processing apparatus to:
   receive a dragged text selection;
   identify whether the text selection represents a Uniform Resource Locator ("URL") resource or a text resource, the drag flavor, wherein identifying includes:
      using the text selection to automatically generate an Internet location object when a URL resource is identified, the URL resource including an Internet location, and
      using the text selection to perform an identification routine when a text resource is identified, wherein the identification routine includes parsing intelligence for determining whether the text selection is incomplete, and wherein when the text selection is incomplete, an Internet location object is automatically generated by completing the text selection so that the completed text selection identifies an Internet location; and
   associate each Internet location object with one of a plurality of programs according to an Internet location type, wherein when an Internet location object is activated, the associated program is run, and the associated program retrieves the identified resource based upon the Internet location object.

28. The computer-program product of claim 27, wherein an Internet location manager generates Internet location objects, specifies corresponding Internet location object behavior, and effectuates the Internet location object behavior when the corresponding Internet location object is activated.

29. The computer-program product of claim 28, wherein the parsing intelligence is incorporated into the Internet location manager.

30. The computer-program product of claim 27, wherein the identification routine is customizable.

31. The computer-program product of claim 30, wherein customizing the identification routine includes adding or removing one or more header substrings.

32. The computer-program product of claim 30, wherein customizing the identification routine includes specifying a confidence level for automatically generating the Internet location object.

33. The computer-program product of claim 27, wherein a file manager performs the identification routine.

34. The computer-program product of claim 33, wherein the identification routine includes parsing the text selection for particular header substrings, particular sub-header substrings, and particular tail strings.

35. The computer-program product of claim 27, wherein a particular identification routine is performed whenever the text selection includes highlighted text.

36. The computer-program product of claim 27, wherein the Internet location object includes a text resource and a URL resource, wherein the URL resource includes the URL, and wherein the text resource includes the text used to generate the Internet resource object.

37. The computer-program product of claim 27, wherein the Internet location object is represented by an icon, wherein the icon is associated with a default name, and wherein double-clicking the icon activates the associated Internet location object.

38. The computer-program product of claim 27, wherein when the text selection includes an Internet location, a dialog is displayed.

39. The computer-program product of claim 27, wherein Internet location types include Web locations and e-mail addresses.

* * * * *

UNITED STATES PATENT AND TRADEMARK OFFICE
CERTIFICATE OF CORRECTION

| | | |
|---|---|---|
| PATENT NO. | : 7,954,061 B2 | Page 1 of 1 |
| APPLICATION NO. | : 10/832769 | |
| DATED | : May 31, 2011 | |
| INVENTOR(S) | : Peter Joseph McInerney | |

It is certified that error appears in the above-identified patent and that said Letters Patent is hereby corrected as shown below:

In sheet 4 of 4, figure 4, Adjacent to Box S70, line 1, delete "110" and insert -- S110 --, therefor.

In column 4, line 28, delete "news:," and insert -- news://, --, therefor.

In column 5, line 23, delete "n" and insert -- in --, therefor.

In column 7, line 30, in Claim 27, before "wherein" delete "the drag flavor,".

Signed and Sealed this
Twentieth Day of December, 2011

David J. Kappos
*Director of the United States Patent and Trademark Office*